US009838424B2

(12) United States Patent
Brady et al.

(10) Patent No.: US 9,838,424 B2
(45) Date of Patent: Dec. 5, 2017

(54) TECHNIQUES TO PROVIDE NETWORK SECURITY THROUGH JUST-IN-TIME PROVISIONED ACCOUNTS

(71) Applicant: MICROSOFT TECHNOLOGY LICENSING, LLC, Redmond, WA (US)

(72) Inventors: Shane Brady, Seattle, WA (US); Siddhartha Mathur, Sammamish, WA (US); Rajalakshmi Dani, Redmond, WA (US); Santosh Kumar, Sammamish, WA (US); Luke Schoen, Redmond, WA (US); David Hetherington, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 79 days.

(21) Appl. No.: 14/220,486

(22) Filed: Mar. 20, 2014

(65) Prior Publication Data
US 2015/0271200 A1 Sep. 24, 2015

(51) Int. Cl.
*H04L 29/06* (2006.01)
*G06F 21/62* (2013.01)

(52) U.S. Cl.
CPC ........ *H04L 63/1466* (2013.01); *G06F 21/629* (2013.01); *G06F 21/6218* (2013.01); *H04L 63/1416* (2013.01)

(58) Field of Classification Search
CPC .... H04L 63/08; H04L 63/102; G06F 21/6218
USPC .......................................................... 726/4
See application file for complete search history.

(56) References Cited

U.S. PATENT DOCUMENTS

| 7,529,931 B2 * | 5/2009 | Vasishth | ............... H04L 63/102 |
| | | | 713/164 |
| 8,126,920 B2 * | 2/2012 | Hu | ......................... G06Q 40/02 |
| | | | 707/784 |
| 2003/0204445 A1 * | 10/2003 | Vishik | .................... G06Q 20/10 |
| | | | 705/26.42 |

(Continued)

FOREIGN PATENT DOCUMENTS

WO 2011159842 A2 12/2011

OTHER PUBLICATIONS

International Search Report and Written Opinion received for PCT Application No. PCT/US2015/021120, dated Jul. 7, 2015 12 pages.

(Continued)

*Primary Examiner* — Jason K. Gee
*Assistant Examiner* — Thanh T Le

(57) ABSTRACT

Techniques to contain lateral movement of attackers through just-in-time (JIT) provisioned accounts comprising an account management component to receive a request from a first account via a client device for a second account to access a server device in a set of server devices, an account authorization component to authorize the request for the second account based at least partially on account information associated with the first account, an account provisioning component to provision the second account to enable a client to access the server device, and an account notification component to provide account information associated with the second account to a client via the client device. Other embodiments are described and claimed.

16 Claims, 9 Drawing Sheets

(56) References Cited

U.S. PATENT DOCUMENTS

| | | | | |
|---|---|---|---|---|
| 2004/0015702 | A1* | 1/2004 | Mercredi | G06F 21/32 713/182 |
| 2004/0162789 | A1* | 8/2004 | Huscher | G06Q 20/401 705/75 |
| 2006/0174104 | A1* | 8/2006 | Crichton | G06F 21/33 713/155 |
| 2007/0157292 | A1 | 7/2007 | Danner et al. | |
| 2009/0077636 | A1* | 3/2009 | Duffie, III | G06F 21/335 726/5 |
| 2010/0268645 | A1* | 10/2010 | Martino | G06Q 20/10 705/44 |
| 2011/0041166 | A1* | 2/2011 | Mani | G06F 21/31 726/6 |
| 2011/0047629 | A1* | 2/2011 | Mitchell | G06F 21/31 726/28 |
| 2011/0213843 | A1* | 9/2011 | Ferrazzini | H04L 63/102 709/206 |
| 2012/0047057 | A1* | 2/2012 | Frankel | G06Q 40/00 705/35 |
| 2012/0324546 | A1* | 12/2012 | Forster et al. | 726/4 |
| 2013/0036459 | A1* | 2/2013 | Liberman | H04L 9/0866 726/6 |
| 2013/0041824 | A1* | 2/2013 | Gupta | G06Q 40/00 705/44 |
| 2013/0080636 | A1* | 3/2013 | Friedman | H04L 41/08 709/225 |
| 2013/0091171 | A1* | 4/2013 | Lee | G06F 21/41 707/784 |
| 2013/0239166 | A1 | 9/2013 | MacLeod et al. | |
| 2013/0283060 | A1* | 10/2013 | Kulkarni | G06F 21/6218 713/189 |
| 2014/0059651 | A1* | 2/2014 | Luster | G06F 21/604 726/4 |
| 2014/0181934 | A1* | 6/2014 | Mayblum | H04L 63/10 726/7 |
| 2014/0198330 | A1* | 7/2014 | Gajera | H04N 1/00519 358/1.13 |
| 2015/0033306 | A1* | 1/2015 | Dickenson | G06F 21/31 726/7 |
| 2015/0134524 | A1* | 5/2015 | Kaufman | G06Q 20/40 705/44 |
| 2015/0215309 | A1* | 7/2015 | Aigner | H04L 63/0853 726/4 |

OTHER PUBLICATIONS

"Network Segmentation", Wikipedia, < https://en.wikipedia.org/w/index.php?title=Network_segmentation&oldid=567218490, Aug. 5, 2013 , 1 page (Author unknown).

* cited by examiner

TECHNIQUES TO PROVIDE NETWORK SECURITY THROUGH JUST-IN-TIME PROVISIONED ACCOUNTS

BACKGROUND

With various high paced development methodologies available today for designing Software as a Service (SaaS) systems, numerous users (e.g., testers, engineers, contractors, internal customers, and/or external customers) may need access to servers hosting one or more services of the SaaS systems for the purposes of testing, upgrading, debugging, developing, deploying, and/or maintaining these servers on a daily basis. With numerous users requiring access to the servers, each user may be granted one or more user accounts to access these servers. However, as the number of user accounts increase, so does the associated security risk. This is because each additional user account may expose a potential entry point for attackers and consequently, increase the attack surface or vector for the attackers to gain unauthorized access. These potential entry points become particularly problematic when some user accounts may have elevated privileges (e.g., administrative privileges) in order to perform their day-to-day tasks. Even when attackers do not initially have access to a user account having elevated privileges, the attackers may employ techniques such as, for example, a "pass the hash attack" to gain access to a user account with elevated privileges in order to disrupt services of the SaaS systems. Such unauthorized access by attackers may cause considerable harm to a business and raise serious security and privacy concerns for customers.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to enhance network security by containing lateral movement of attackers through Just-In-Time (JIT) provisioned accounts or JIT accounts. Some embodiments are particularly directed to techniques for managing JIT accounts. In one embodiment, for example, an apparatus may comprise a processor circuit; and a server application for execution by the processor circuit. The server application may comprise an account management component to receive a request from a first account via a client device for a second account to access a server device in a set of server devices, an account authorization component to authorize the request for the second account based at least partially on account information associated with the first account, an account provisioning component to provision the second account to enable a client to access the server device, and an account notification component to provide account information associated with the second account to a client via the client device. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
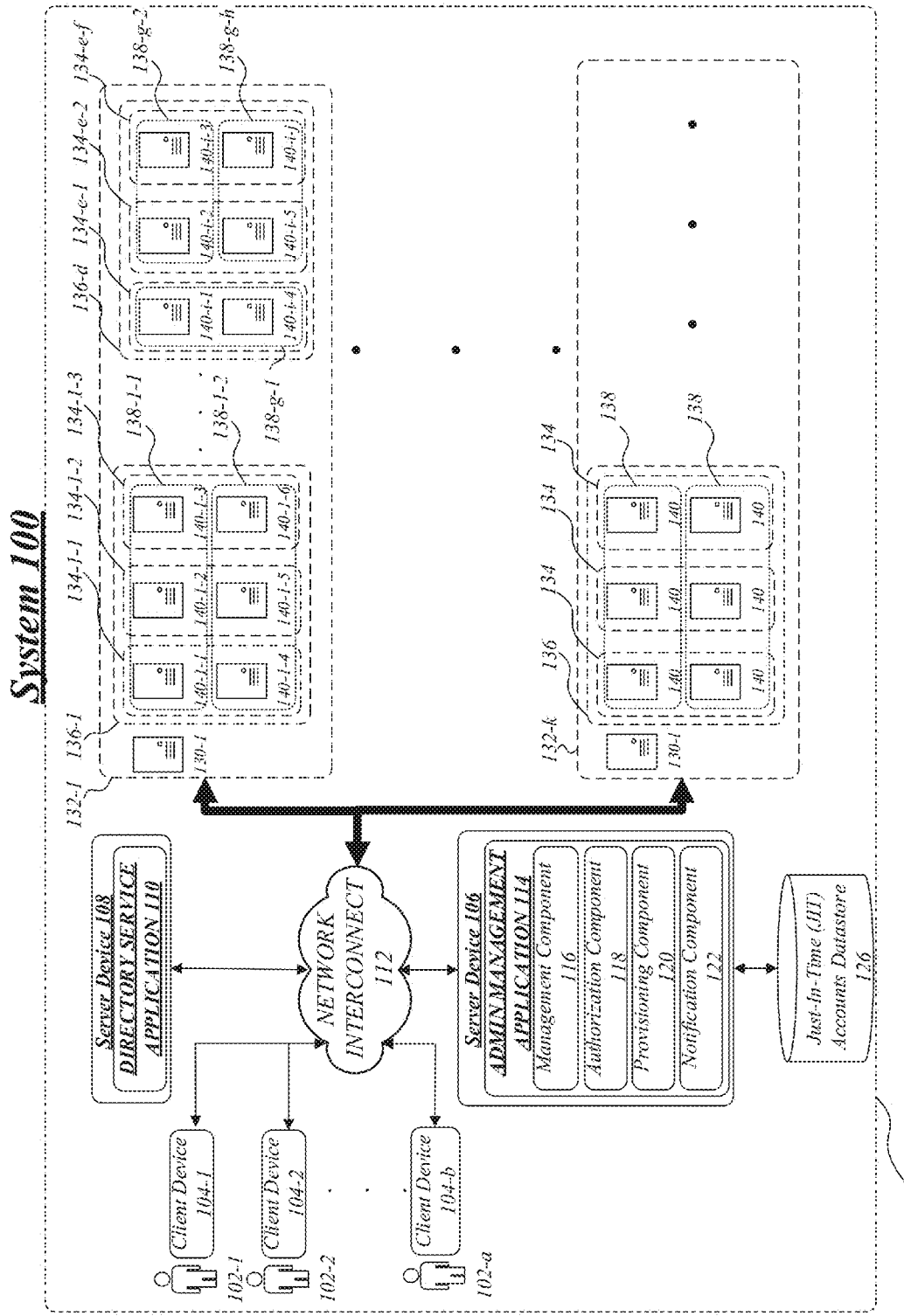
FIG. 1 illustrates an embodiment of a JIT account provisioning system for provisioning JIT accounts.

Various embodiments are directed to a network account provisioning system arranged to provide identity segmentation by implementing breach boundaries and partitioning of credentials. By utilizing breach boundaries and providing just-in-time (JIT) accounts to clients that servicing, managing, and/or utilizing one or more resources and/or assets associated with a SaaS system, the security and privacy of the SaaS system may be substantially improved. To achieve these and other improvements, the network account provisioning system may generally be arranged to partition or segment at least a portion (e.g., a domain) of the SaaS system into two or more breach boundaries, where each breach boundary may be associated with one or more resources and/or assets (e.g., servers, work stations, computing devices, mobile devices, applications, services, and/or software/hardware components) and further associated with a security group arranged to manage access permissions to those resources within that breach boundary.

To enable the clients (e.g., users, engineers, contractors, customers, and/or software/hardware components) access to those resources and/or assets, the JIT account provisioning system may be further arranged to add the one or more JIT accounts as members in a security group associated with the breach boundary including those resources and/or assets. In this manner, the JIT accounts may enable the clients with existing accounts having lower or lowest privileges and/or permissions, to obtain a JIT account with elevated privileges to perform one or more services (e.g., testing, upgrading, debugging, developing, deploying, and/or maintaining the one or more resources of a SaaS System) that may need elevated privileges to perform.

To obtain the JIT accounts with elevated privileges for performing the one or more services on one or more resources and/or assets in the SaaS system, the JIT account provisioning system may be arranged to receive requests from clients for elevated access permissions in order to access the resources and/or assets of the SaaS system. In response, the JIT account provisioning system may be arranged to provision the JIT accounts as part of the requests for elevated access permissions. Each request may be further associated with a requested role and scope provided by the client so that the JIT account provisioning system may provision each JIT account with minimally scoped permissions needed to perform a task or service as requested by the client.

Once the request is approved by another client and/or automatically authenticated by the JIT account provisioning system, the JIT account provisioning system may be further arranged create the JIT account for the requested role and scope in response to the approval. In cases when a JIT account associated with the client already exists, the JIT account provisioning system may be arranged to re-use the existing JIT account previously created for the same or substantially similar role and scope requested by the client. By lazy provisioning the JIT accounts in conjunction with the re-use of previously created JIT accounts, the number of JIT accounts the JIT account provisioning system may be needed to manage may be significantly reduced.

To inform the clients whether a request has been authenticated, approved, and/or rejected, the JIT account provisioning system may be further arranged to provide notification to the client whether the request for a JIT account with elevated access permissions has been authenticated, approved and/or rejected. If the request for the JIT account with elevated access permissions has been authenticated and/or approved, the JIT account provisioning system may further notify the clients regarding the approval and provide JIT account information associated with the provisioned JIT account. The client may then use the JIT account information to access and/or service, with elevated access permissions, the one or more resources and/or assets within the role and scope of the provisioned JIT account.

To further ensure the security and privacy of the SaaS system, the JIT account provisioning system may be further arranged to associate each JIT account with a lifetime (e.g., 4 hours) so that each JIT account may be disabled at the end of their associated lifetime. The lifetime associated with each account may be explicitly provided by the clients in their requests for JIT accounts. Additionally or alternatively, the lifetimes may be intrinsic to the scopes and roles associated with particular JIT accounts. For one or more JIT accounts that have remained inactive for long periods of time (e.g., a month), the JIT account provisioning system may be further arranged to remove or destroy the inactive JIT accounts from the JIT account provisioning system.

As a result, the JIT account provisioning system can improve the security and privacy of the SaaS system by limiting the lateral movement of attackers between breach boundaries and confining the attackers to a single breach boundary so that the best an attacker can do by compromising a JIT account is to laterally move between resources and/or assets within the same scope of impact. The JIT account provisioning system also makes any existing client accounts associated with clients uninteresting to attackers as they will be generally restricted to lower or lowest level of access permissions and any request for a JIT account with elevated access permissions may need prior approval. Even when a JIT account with elevated access permissions is compromised, the attacker will be confined to a single breach boundary and their access will have a limited lifetime before the JIT account becomes disabled. In this manner, security and privacy of the SaaS system may be greatly improved.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the needed purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the needed method steps. The needed structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates an embodiment of the JIT account provisioning system 100. In various embodiments, the JIT account provisioning system 100 may be implemented in or with an enterprise computing environment 150 (e.g., cloud storage systems, data centers, etc.) comprising one or more clients 102-a (e.g., users, engineers, contractors, customers, and/or software/hardware components) where each client (e.g., client 102-1 or 102-2) may be associated with one or more client accounts and each client account of the one or more client accounts may be further associated with client account information. The client account information may include, but is limited to, client account authentication information (e.g., user-principal-name (UPN), account identifier, account password or hashed and/or salted derivatives thereof, account domain, smart card certificates, biometrics, etc.), client account authorization information (e.g., client account role and scope information, access permissions, associated groups, etc.), and/or any other information relevant to the authentication and authorization of the one or more clients 102-a.

The one or more clients 102-a may utilize the one or more client accounts to request JIT accounts having elevated access permissions for servicing one or more resources and/or assets such as, for example, server devices 140-i-j arranged to provide one or more services of one or more SaaS systems (e.g., MICROSOFT Office 365, MICROSOFT Exchange Online MICROSOFT SharePoint Online, MICROSOFT Dynamics CRM, etc.). The server devices 140-i-j may be further interconnected between and among each other via network interconnect 112 in order to provide the services of the SaaS systems. It may be appreciated that server devices 140-i-j in various embodiments are merely referenced for purposes of illustration and not limitation. As such, any or all of the server devices 140-i-j in various embodiments may be replaced with any other resources and/or assets such as, for example, virtual devices, work stations, computing devices, mobile devices, applications, services, and/or other software/hardware components.

It is also worthy to note that "a" and "b" and "c" and similar designators as used herein are intended to be variables representing any positive integer. Thus, for example, if an implementation sets a value for a=2, then a complete set of clients 102-a may include clients 102-1 and 102-2. In an another example, if an implementation sets values for i=1 and j=6, then a complete set of server devices 140-i-j may include server devices 140-1-1, 140-1-2, 140-1-3, 140-1-4, 140-1-5, and 140-1-6. The embodiments are not limited in this context.

The JIT account provisioning system 100 may comprise one or more client devices 104-b (e.g., laptops, computers, phones, work stations, or any other computing devices) used by the clients 102-a for servicing the server devices 140-i-j of one or more SaaS systems (e.g., testing, upgrading, debugging, developing, deploying, and/or maintaining the one or more resources and/or assets of the SaaS Systems) via the network interconnect 112. Moreover, the network interconnect 112 may be arranged to provide network connectivity between and among a variety devices, components, applications, servers, resources, and/or assets in the enterprise computing environment 150 over one or more networks (e.g., intranet and/or internet) utilizing one or more network devices (e.g., repeaters, bridges, hubs, switches, routers, gateways, load balancers, etc.).

The JIT account provisioning system 100 may comprise or be integrated with one or more directory service server devices 130-l which may be generally arranged to execute, among other applications, directory service application (not shown) in order to organize the server devices 140-i-j into a hierarchy of one or more logical groups, logical subgroups, and/or logical sub subgroups (e.g., forests 132-k, domains 136-d, and/or organizational units 134-e-f). The directory service server devices 130-l may also be arranged to store the hierarchy in one or more directory service datastores (not shown) comprising directory service information.

The directory service information may comprise JIT account information associated with one or more JIT accounts so that the one or more directory service server devices 130-l may authenticate access requests from one or more clients 102-a using JIT accounts to access the one or more resources and/or assets. The JIT account information may include, but is limited to, JIT account authentication information (e.g., user-principal-name (UPN), account identifier, account password or hashed and/or salted derivatives thereof, account domain, smart card certificates, biometrics, etc.), JIT account authorization information (e.g., JIT account role and scope information, JIT account access permissions, JIT account associated groups, etc.), JIT account lifetime information (e.g., lifetime of a JIT account), the directory service information (e.g., a directory service server device associated with a JIT account), and/or any other information relevant to the authentication, authorization, and lifetime of the one or more JIT accounts.

In various embodiments, each directory service server device (e.g., directory service server device 130-1) may comprise or implement a directory service application (not shown). Exemplary directory service applications may include, but are not limited to, MICROSOFT Active Directory, NOVELL eDirectory, APPLE Open Directory, ORACLE Internet Directory (OID), IBM Tivoli Directory Server, or any other application that implements the Directory Access Protocol (DAP), Lightweight Directory Access Protocol (LDAP), and/or X.500 standards promulgated by the International Telecommunication Union (ITU) Telecommunication Standardization Sector (ITU-T).

By way of illustration, the directory service server device 130-1 may comprise or implement at least a portion of MICROSOFT Active Directory (e.g., Active Directory Domain Services, Active Directory Domain Controllers, Active Directory Datastores, etc.). Each directory service server device (e.g., directory service server device 130-1) of the one or more directory service server devices 130-l may be arranged to manage a top level logical group such as, for example, forest 132-1. The one or more forests 132-k may comprise one or more lower logical groups, e.g., logical subgroups, such as, for example, domains 136-d. Each domain (e.g., domain 136-1) of the one or more domains 136-d may be arranged to manage lower level logical groups, e.g., logical sub subgroups, such as, for example, organizational units 134-e-f. Optionally, the domains 136-d may be further logically grouped into one or more intermediate logical groups between the forests 132-k and domains 136-d, such as, for example, trees (not shown). Each organizational unit (e.g., organizational unit 134-1-1) of the one or more organizational units 134-e-f may comprise one or more resources and/or assets, such as, for example, server devices 140-g-h.

It may be appreciated that the forests 132-k, domains 136-d, and/or organizational units 134-e-f in various embodiments are merely referenced for purposes of illustration and not limitation. As such, any or all of the forests 132-k, domains 136-d, and/or organizational units 134-e-f in various embodiments may be replaced with their substantial equivalents for a given implementation. For example, in one implementation where the directory service server device 130-1 may comprise or implement at least a portion of NOVELL eDirectory, the forests 132-k, domains 136-d, and organizational units 134-e-f may be replaced with trees, partitions, and organizational units as implemented in NOVELL eDirectory, respectively. The embodiments are not limited in this context.

To contain the lateral movement of an attacker, each domain (e.g., domain 136-1) of the JIT account provisioning system 100 may further comprise one or more breach boundaries 138-g-h. For example, domain 136-1 may comprise breach boundaries 138-1-1 and 138-1-2. Additionally, in some implementations, the breach boundaries 138-g-h may be independent of the one or more organizational units 134-e-f. For example, in domain 136-1, organizational units 134-1-1, 134-1-2, 134-1-3 may span across breach boundaries 138-1-1 and 138-1-2, so that a single breach boundary, such as breach boundary 138-1-1 may include resources and/or assets, such as, for example, server devices 140-1-1, 140-1-2, 140-1-3, from all three organizational units 134-1-1, 134-1-2, 134-1-3. In other domains, such as, for example, domains 136-d, breach boundaries 138-g-h, such as, for example, breach boundary 138-g-1 may co-exist with organizational units 134-e-f, such as, for example, organizational unit 134-e-1 so that a single breach boundary such as breach boundary 138-g-1 may include resources and/or assets, such as, for example, server devices 140-i-1, 140-i-4, from a single organizational unit 134-e-1.

The one or more breach boundaries 138-g-h may be generally managed by one or more directory service server devices 130-l and arranged to grant or provide a set of access permissions for one or more JIT accounts that may be associated with the security boundary so that the one or more JIT accounts may access the one or more resources and/or assets within the security boundary. To further ensure that an attacker having access to a JIT account cannot move between and among the one or more breach boundaries 138-g-h utilizing a "pass the hash attack," each breach boundary (e.g., breach boundaries 138-1-1 and 138-1-2) of the one or more breach boundaries 138-g-h may be further arranged to include a mutually exclusive or non-overlapping set of resources and/or assets so that there is no overlap between any breach boundaries 138-g-h.

The JIT account provisioning system 100 may comprise server device 108 which may be generally arranged to execute, among other applications, directory service application 110. The directory service application 110 may generally be arranged store and provide client account information associated with the one or more client accounts of clients 102-a. The directory service application 110 may also be arranged to store organizational hierarchy information comprising hierarchical structure of an organization that the one or more clients 102-a may be a member or affiliate of (e.g., a corporation) so that any supervisors and/or managers of the one or more clients 102-a may be identified. The directory service application 110 may be further arranged to authenticate or assist in the authentication of one or more clients 104-a requesting JIT accounts having elevated access permissions via the admin management application 114. Exemplary directory service applications or implementations may include, but are not limited to, those previously discussed with respect to directory service server devices 130-l.

To authenticate or facilitate the authentication of one or more clients 102-a requesting a JIT account having elevated access permissions, the directory service application 110 may also expose and/or implement one or more application program interfaces (APIs) for the admin management application 114 to authenticate the one or more clients 102-a requesting elevated access permissions. For example, the admin management application 114 may authenticate the one or more clients 102-a requesting elevated access permissions by utilizing via network interconnect 112, one or more APIs, and/or one or more local procedural call (LPC) and/or remote procedural call (RPC) mechanisms of the directory service application 110. Exemplary APIs may include, but are not limited to, ADP API, LADP API, MICROSOFT Active Directory Service Interfaces (ADSI) API, MICROSOFT Messaging API (MAPI), MICROSOFT Directory System Agent (DSA) API, and/or any other API that enables authentication of clients 102-a.

The JIT account provisioning system 100 may comprise server device 106 which may be generally arranged to execute, among other applications, admin management application 114. The admin management application 114 may generally be arranged to receive requests from one or more clients 102-a to elevate access permissions and authenticate the one or more requests received from clients 102-a. Additionally, the admin management application 114 may be further arranged to manage, authorize, provision one or more JIT accounts having the elevated access permissions requested by the clients 102-a and notify the clients 102-a with JIT account information associated with the provisioned JIT accounts.

In various embodiments, the admin management application 114 may comprise an account management component 116. The account management component 116 may be generally arranged to authenticate one or more clients 102-a requesting JIT accounts having elevated access permissions and receive one or more requests from the one or more one or more clients 102-a via client devices 104-b to elevate access permissions in order to perform one or more actions or tasks on a resource and/or asset.

By way of illustration, the account management component 116 may enable client 102-1 to authenticate to the admin management application 114 before enabling the client 102-1 to request for a JIT account having elevated access permissions. To enable the client 102-1 to be authenticated, the account management component 116 may request and/or receive at least a portion of the client account information (e.g., account identifier and/or account password) from the client 102-1 where the received client account information may be associated with the client account of the client 102-1. The account management component 116 may receive the client account information (e.g., UPN, account identifier, and/or password) via one or more applications and/or components of the client device 104-1 (e.g., a web browser of a computing device). In response to the received client account information, the account management component 116 may authenticate the client 102-1 based at least partially on the received client account information and the previously stored client account information accessible by the directory service application 110. Moreover, to authenticate the client 102-1 based at least partially on the previously stored client account information accessible by the directory service application 110, the account management component 116 may be configured to utilize via network interconnect 112 and one or more APIs of the directory service application 110.

Continuing with the above example, once the client 102-1 has been authenticated, the account management component 116 may be configured to enable client 102-1 to input JIT account request information. The JIT account request information may include, but is not limited to, one or more actions or tasks to be performed, the one or more server devices 140-i-j, and a requested lifetime information associated with the one or more actions or tasks. The requested lifetime information may include, but is not limited to, a specific time or elapse of time of when the JIT account expires and becomes disabled and/or a specific time or elapse of time when the JIT account is removed.

Additionally or alternatively, the account management component 116 may be configured to limit the requested lifetime information received from one or more clients 102-a to a ceiling value so that the lifetime associated with a JIT account cannot exceed a predetermined amount of time (e.g., minutes, hours, days, weeks, years, etc.). In one exemplary embodiment, the account management component 116 may limit a requested lifetime information for a JIT account having elevated access permissions to a ceiling value of 72 hours or 3 days so that any request for a JIT account with a lifetime greater than 72 hours (e.g., 4 days) will be limited to 72 hours or 3 days. The embodiments are not limited in this context.

Additionally or alternatively, the account management component 116 may also be configured to provide a one or more predefined roles and scope associated with the enterprise computing environment 150 and enable one or more clients 102-a to select the one or more predefined roles and scope based on the actions or tasks to be performed and which resource and/or asset the actions or tasks are to be performed on.

Exemplary actions or tasks to be performed may include, but are not limited to, remote application debugging, application backups, application upgrades and/or maintenance, server upgrades and/or maintenance, testing and/or any other actions or tasks that may need access and/or modification of one or more resources and/or assets. Exemplary requested lifetime information may include, but is not limited to, the number of days, minutes, hours, and/or seconds for a JIT account may remain enabled and/or the specific time of the day and the date before which the JIT account may remained enabled.

In various embodiments, the admin management application 114 may further comprise an account authorization component 118. The account authorization component 118 may be generally arranged to determine requested role and scope information and client account role and scope information. The account authorization component 118 may be further arranged to provide the client account role and scope information to the clients and authorize the request to elevate access permissions based on the requested role and scope information and the client account role and scope information.

In one embodiment, the account authorization component 118 may be configured to determine requested role and scope information based at least partially on the received JIT account request information and the directory service information provided by the directory service server devices 130-l. To determine the requested role and scope information, the account management component 116 may be configured to identify one or more requested roles based on the requested actions or tasks provided by one or more clients 102-a via one or more client devices 104-b.

To determine the requested scope, the account authorization component 118 may be further configured to communicate with directory service server devices 130-l and identify the security boundary comprising the resources and/or assets the clients 102-a requests to perform the actions or tasks on. Exemplary requested roles may include, but are not limited to, administrators, backup operators, debuggers, remote users, testers, and the like. It may be appreciated that each role may be further associated with a set of access permissions that may grant and/or deny access to the one or more resources and/or assets and/or components of the one or more resources and/or assets. Exemplary requested scope may include, but are not limited to, one or more server devices 140-1-1, 14-1-2, 14-1-3 or any other resources and/or assets and/or components of the resources and/or assets.

By way of illustration, when client 102-1 requests to perform remote application debugging on server device 140-1-1, the requested role and scope information determined by the account authorization component 118 and associated with the requested action or task may include roles for a remote user and a debugger and the scope may include breach boundary 138-1-1. Additionally or alternatively, the received JIT account request information from client 102-1 may comprise a client's selection of one or more predefined roles and scope information previously discussed with respect to the account management component 116, so that the account management component 116 may easily and readily determine the requested role and scope information based on the received JIT account request information.

In one embodiment, the account authorization component 118 may be further configured to determine the client account role and scope information by utilizing via network interconnect 112 and one or more APIs of the directory service application 110 to retrieve the client account role and scope information associated with one or more clients 102-a requesting JIT accounts with elevated access permissions. Additionally or alternatively, the account authorization component 118 may be further configured to provide, via account notification component 122, the retrieved client account role and scope information associated with the one or more clients 102-a before receiving the requested role and client information from one or more clients 102-a via client devices 104-b. This may enable the one or more clients 102-a to provide requested role and scope information that are within or in comport with their client account role and scope information.

Once the client account role and scope information is retrieved from the directory service application 110, the account authorization component 118 may automatically authorize the request for elevated access permissions based at least partially on whether the requested role and scope is within or in comport with client account role and scope associated with the clients 102-a requesting the JIT accounts. If the requested role and scope by a client is equivalent to or within a client account role and scope associated with the client, then the account authorization component 118 may be configured to authorize the request for a JIT account having elevate access permissions. Otherwise, the account authorization component 118 may reject the request for a JIT having elevated access permissions.

By way of illustration, when client 102-1 requests to perform remote application debugging on server device 140-1-1, the requested role and scope information may include roles for a remote user and a debugger and the scope may include breach boundary 138-1-1. The client account role and scope information associated with the client account of the client 102-1 and retrieved from the directory service application 110 may include roles for a remote user and a debugger and the scope may include forest 132-1. Based on the requested role and scope information and client account role and scope information, the account authorization component 118 may authorize the request for a JIT account because the role requested by the client 102-1 (e.g., remote user and debugger) is equivalent to the role of the client account (e.g., remote user and debugger) and the scope requested by the client (e.g., breach boundary 138-1-1) is within the scope of the client account (e.g., forest 132-1).

In another illustration, the requested role and scope information may be determined to include roles for a remote user and a debugger and the scope may include breach boundary 138-1-1. The client account role and scope information of the client 102-1 retrieved from the directory service application 110 may include roles for debugger but not remote user and the scope may include forest 132-2 (not shown). The account authorization component 118 may reject the request because the role requested by the client 102-1 (e.g., remote user and debugger) is not equivalent to or within the role of the client account (e.g., debugger but not including remote user) and the scope requested by the client (e.g., breach boundary 138-1-1) is also not within the scope of the client account (e.g., forest 132-2).

Additionally or alternatively, to ensure security and privacy of the SaaS systems, the client account role and scope information may be further limited in order to restrict the requested role and scope information, by limiting the number and the type of requested roles and the scope a client may request. Thus, in some embodiments, the client account role and scope information may further limit the number of requested roles to a single role, and the types of roles to a specific collection of roles (e.g., remote user, debugging, and/or testing), and the scope to a single breach boundary so that any requested role and scope received from a client that does not fit within those restrictions will be rejected by the authorization component 118. Consequently, any JIT account provisioned by the account provisioning component 120 will be further limited in their role and scope.

By way of illustration, the requested role and scope information may be determined to include roles for a remote user and a debugger and the scope may include breach boundary 138-1-1. The client account role and scope information associated with the client 102-1 may include roles for a remote user and a debugger, however, the client account role and scope information may further limit the role to a single role (e.g., a remote user or debugger but not both) and the scope may be limited to a single breach boundary. The account authorization component 118 may reject the request because the role requested by the client 102-1 (e.g., both remote user and debugger) is not within the single role restriction (e.g., remote user or debugger but not both).

At least one technical advantage realized by further limiting client account role and scope is that every JIT account authorized and later provisioned by the account provisioning component 120 will be of limited role and scope in order to ensure that each JIT account is provisioned with minimally scoped permissions needed to perform a task or service as requested by the client. Thus, even though attack surface or attack vector may increase with the increase in number of JIT accounts, the effect is mitigated because each provisioned JIT account will be limited in role and scope.

Additionally or alternatively, to further ensure security and privacy of the SaaS systems, the account authorization component 118 may be further configured to determine a supervisor or manager of the one or more clients 102-a requesting elevated access permissions by utilizing via network interconnect 112 and one or more APIs of the directory service application 110 to identify the supervisor or manager of the one or more clients 102-a based on the organizational hierarchy information accessible by the directory service application 110. Once the supervisor or manager of the one or more clients 102-a is determined, the account authorization component 118 may be configured to notify and provide the supervisor or manager via the account notification component 122 supervisory approval information. The supervisory approval information may include requested role and scope account information, requested lifetime information, and client account role and scope information for the one or more clients 102-a requesting JIT accounts. The account authorization component 118 may also be configured to request and receive approval from the supervisor or manager of the one or more clients 102-a before authorizing the request.

By way of illustration, before authorizing or a request for a JIT account with to elevate access permissions for client 102-1 but after determining the requested role and scope information and client account role and scope information, the account authorization component 118 may determine that the supervisor or manager is client 102-2 and may notify and provide client 102-2 with the requested role and scope information and the client account role and scope information of the client 102-1 via account notification component 122. The account authorization component 118 may further request and receive approval from the client 102-2 before authorizing or the request.

In various embodiments, the admin management application 114 may further comprise an account provisioning component 120 communicatively coupled to a JIT accounts datastore 126. The JIT account datastore 126 may be generally arranged to store JIT account information associated with one or more JIT accounts. The account provisioning component 120 may generally be arranged to provision a JIT account after the request for a JIT account has been authorized. The account provisioning component 120 may be further arranged to determine whether a JIT account having same or substantially similar requested role and scope already exists for a client. The account provisioning component 120 may be arranged to retrieve an existing JIT account associated with the client when the JIT account having same or substantially similar requested role and scope already exists for the client. Alternatively, when the JIT account having same or substantially similar requested role and scope does not already exist for the client, the account provisioning component 120 may be generally arranged to create a new JIT account. After creating and/or retrieving the JIT account, the account provisioning component 120 may be further arranged to enable the JIT account.

In one embodiment, the account provisioning component 120 may be configured to determine whether a JIT account having a role and scope that is equivalent or substantially similar to the role and scope requested by a client already exists in the JIT accounts datastore 126 for that client. The account provisioning component 120 may determine the existence of a previously created JIT account by searching and/or scanning the JIT accounts datastore 126 and comparing and matching the requested role and scope information with the JIT account role and scope information of existing JIT accounts. When the account provisioning component 120 determines that a JIT account having the requested role and scope already exists for that client, then the account provisioning component 120 may be configured to retrieve the JIT account information associated with the previously created JIT account from the JIT account datastore 126 for that client.

Alternatively, when the account provisioning component 120 determines that a JIT account having the requested role and scope does not exist for that client, the account provisioning component 120 may be configured to automatically create a new JIT account for that client. This is otherwise known as lazy provisioning of a JIT account, where the account provisioning component 120 may be configured to create JIT accounts only when a previous JIT account with equivalent or substantially similar role and scope does not already exist for the client.

In one embodiment, the account provisioning component 120 may create the new JIT account and its associated JIT account information based at least partially on the JIT account request information (e.g., the requested role and scope information, requested lifetime information, etc.), and the client account information. For example, assume that the client account information for the client 102-1 may comprise UPN "EllenAdams@domain136-1.contoso.com", and that the requested roles includes a remote user and a debugger and requested scope includes breach boundary 138-1-1. The account provisioning component 120 may create the new JIT account with JIT account information comprising the UPN "EllenAdams_RemoteDebugger_Boundary138-1-1@domain136-1.contoso.com" so that the client 102-1 may identify the one or more roles and scope for the JIT account based at least partially on the UPN. Additionally, the account provisioning component 120 may also store the newly created JIT account in the JIT accounts datastore 126 and associate the newly created JIT account with the client account for that client.

To ensure that the resources and/or assets managed by one or more directory service server devices 130-l are accessible and/or serviceable by one or more clients 102-a using the newly created JIT accounts, the account provisioning component 120 may be further configured to identify the appropriate directory service server device managing the one or more breach boundaries 138-g-h that includes the one or more resources and/or assets the client requested to access and/or service. Once the appropriate directory service server device is identified, the account provisioning component 120 may be further configured to communicate with the identified directory service server device via network interconnect 112 and one or more APIs of the identified directory service server device in order to create the JIT account. Additionally, the account provisioning component 120 may be configured to store the newly created JIT account and the associated JIT account information in the JIT accounts datastore 126 and associate the newly created JIT account and the associated JIT account information with the client account so that it may be retrieved and re-used.

By way of illustration, assume that the requested roles for client 102-1 includes a remote user and a debugger, the requested scope includes breach boundary 138-1-1, and the request has been authorized by the account authorization component 118, the account provisioning component 120 may first determine whether a JIT account having the roles of a remote user and a debugger and scope that includes breach boundary 138-1-1 was previously created. When a previously created JIT account has been found in the JIT accounts datastore 126 and its associated JIT account information includes roles for a remote user and a debugger and scope includes breach boundary 138-1-1, then the account provisioning component 120 may retrieve the previously created and/or stored JIT account information associated with the JIT account.

Continuing with the above illustration, when no JIT account associated with client 102-1 has been found in the JIT account datastore 126, the account provisioning component 120 may identify directory service server device 130-1 for the creation of a new JIT account because the requested scope includes breach boundary 138-1-1 which is managed by directory service server device 130-1. The account provisioning component 120 may then communicate with directory service server device 130-1 to create the new JIT account. The account provisioning component 120 may further store the newly created JIT account and the associated JIT account information in the JIT accounts datastore 126 for retrieval and re-use.

Once a JIT account is retrieved or created, the account provisioning component 120 may be further configured to enable the JIT account based at least partially on the requested role and scope information, so that the retrieved or created JIT account has the same role and scope as requested by the client. This also ensures that each JIT account that is created or retrieved comprises a set of minimally scoped elevated access permissions needed to access or perform a service on a resource and/or asset as requested by the client. To enable the JIT account, the account provisioning component 120 may be further configured to grant or provide a set of access permissions to the JIT account based at least partially on the requested role and scope information.

In various embodiments, the admin management application 114 may further comprise the account notification component 122. The account notification component 122 may generally be arranged to notify and provide to one or more clients 102-a via one or more client devices 104-b, client account information (e.g., client account role and scope), request approval information (e.g., whether the request to elevate access permissions have been approved or rejected), supervisory approval information, and JIT account information in one or more notification messages. Exemplary notification messages may include, but are not limited to, mobile SMS messaging, automated voice calls, email, interactive web based forms, web alerts, internet and/or intranet based messaging applications, or any other means for notifying one or more clients 102-a regarding the approval and/or rejection of elevated access permissions and providing the one or more clients 102-a with request approval information, supervisory approval information, and/or JIT account information.

In one embodiment, after the request to elevate access permissions has been rejected, the account notification component 122 may be configured to notify the client (e.g., client 102-1) via one or more applications and/or components of one or more client devices 104-b in one or more notification messages that the request has been rejected. Additionally, the one or more notification message may also include JIT account rejection information that may indicate one or more reasons for the rejection (e.g., the request exceeds the client account's role and/or scope).

After the request for a JIT account with elevated access permissions has been approved and the JIT account has been provisioned, the account notification component 122 may be configured to notify the client (e.g., client 102-1) via a client device (e.g., client device 104-1) in one or more notification messages that the request has been approved. The account notification component 122 may also be configured to provide JIT account information associated with the provisioned JIT account having elevated access permissions sufficient to enable a client (e.g., client device 104-1) to access and/or service the one or more resources and/or assets (e.g., server device 104-1-1) in comport with the role and scope of the JIT account.

In another embodiment, before authorizing a request for a JIT account with elevated access permissions for a client (e.g., client 102-1) and after determining requested role and scope information and client account role and scope information for that client, the account notification component 122 may be further configured to request approval from a supervisor or manager (e.g., client 102-2) of that client (e.g., client 102-1) via one or more notification messages before authorizing the request for a JIT account with elevated access permissions. To further assist the supervisor or manager (e.g., client 102-2) in approving or rejecting one or more requests, the account notification component 122 may be further configured to provide supervisory approval information (e.g., requested role and scope account information, requested lifetime information, and client account role and scope information associated with client 102-1 requesting the elevated access permissions) in one or more notification messages to the supervisor or manager (e.g., client 102-2).

Although the JIT account provisioning system 100 shown in FIG. 1 has a limited number of elements in a certain topology, it may be appreciated that the JIT account provisioning system 100 may include more or less elements in alternate topologies as desired for a given implementation. Similarly, while various embodiments may illustrate the enterprise computing environment 150 encompassing the one or more client devices 104-b, the server device 108, the server device 106, and one or more forests 132-k, it may be appreciated that the at least some of the client and/or server devices may be external to the enterprise computing environment 150 for a given implementation.

Figure 2:
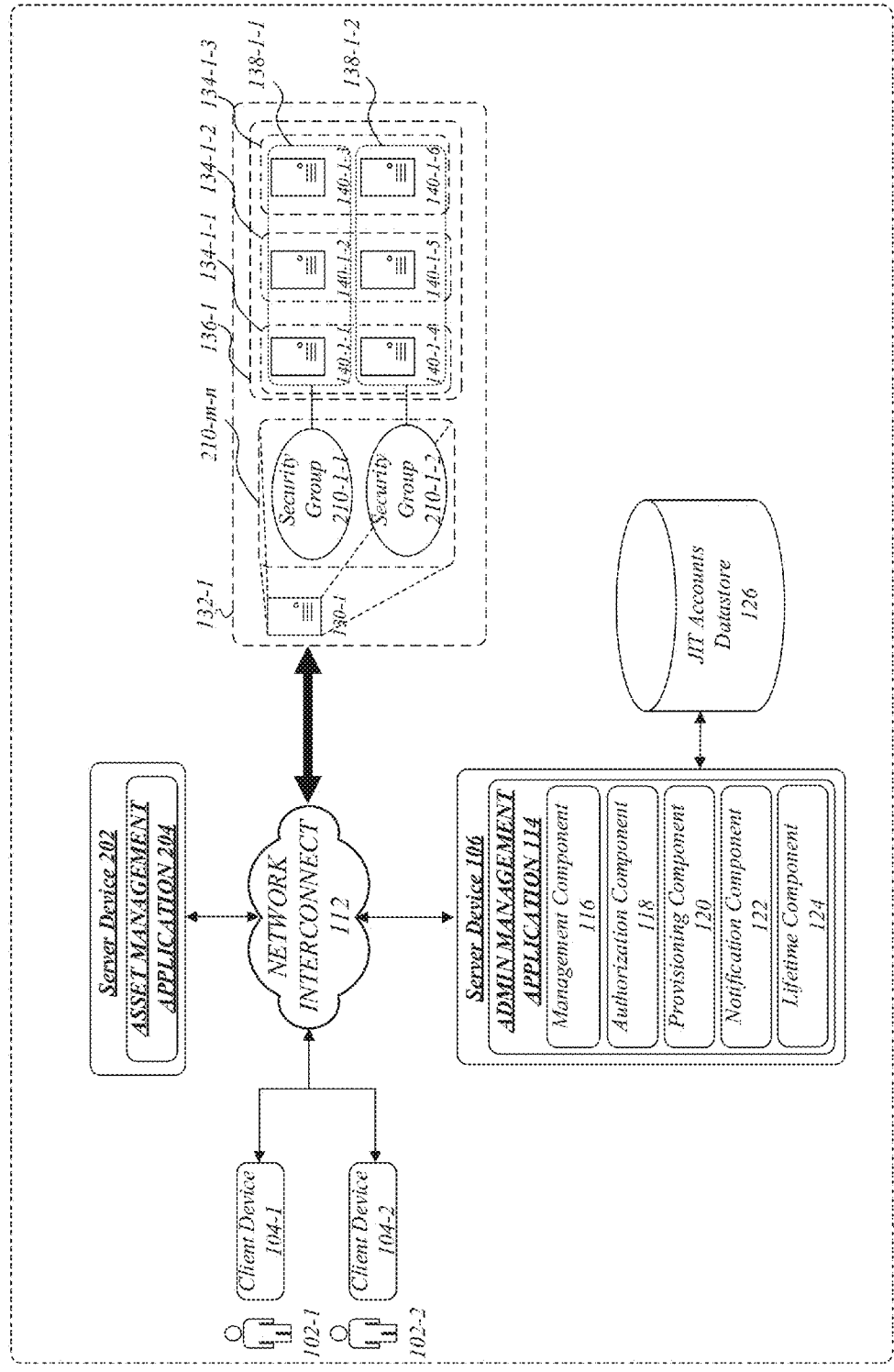
FIG. 2 illustrates another embodiment of the JIT account provisioning system for segmenting, provisioning, and/or configuring one or more resources and/or assets into one or more breach boundaries.

FIG. 2 illustrates another embodiment for the JIT account provisioning system 100. In various embodiments of the JIT account provisioning system 100 may further comprise server device 202 which may be generally arranged to execute, among other applications, resource and asset management application 204. The directory service server devices 130-1 may be further arranged to implement one or more security boundaries 138-g-h utilizing one or more associated security groups, where each security group may be arranged to manage a set of access permissions of one or more resources and/or assets for one or more members of each security group.

The asset management application 204 may be generally arranged to configure or separate one or more resources and/or assets into one or more security groups via network interconnect 112 and one or more APIs of the directory service applications (not shown) of the one or more directory service server devices 130-l. In one embodiment, the asset management application 204 may be configured to implement one or more security boundaries 138-g-h by creating one or more breach boundary security groups 210-m-n. To further contain lateral movement of an attacker that has gained access to a compromised JIT account, in some embodiments, the asset management application 204 may be further arranged to configure or separate the one or more resources and/or assets into one or more mutually exclusive or non-overlapping breach boundary security groups 210-m-n so that no single resource and/or asset is accessible or serviceable from JIT accounts being members of two different breach boundary security groups.

In another embodiment, the asset management application 204 may be further configured to assign each breach boundary security group of the one or more breach boundary security groups 210-m-n a set of access permissions to one or more resources and/or assets, so that any member (e.g., one or more JIT accounts) added to a breach boundary security group may access the one or more resources and/or assets managed by that security group in accordance with the set of access permissions. Additionally or alternatively, in implementations where one or more resources and/or assets comprise virtual devices (e.g., virtual server devices implemented using one or more virtual machines), the asset management application 204 may be further configured to provision or deploy one or more resources and/or assets so that each provisioned resource and/or asset is associated with a breach boundary security group.

By way of illustration, asset management application 204 may implement security boundaries 138-1-1 and 138-1-2 by creating associated breach boundary security groups 210-1-1 and 210-1-2, respectively, utilizing network interconnect 112 and one or more APIs of the directory service application (not shown) of the directory service server device 130-1. Additionally, the asset management application 204 may also configure the server devices 140-1-1, 140-1-2, 140-1-3 to be managed by breach boundary security group 138-1-1 and server devices 140-1-4, 140-1-5, 140-1-6 to be managed by security group 138-1-2.

Continuing with the above illustration, the asset management application 204 may further configure the breach boundary security group 210-1-1 to grant or provide a set of access permissions to server devices 140-1-1, 140-1-2, 140-1-3. The set of access permissions may enable a JIT account to access, in accordance with the set of access permissions associated with the security group 210-1-1, the server devices 140-1-1, 140-1-2, 140-1-3, when the JIT account is added to breach boundary security group 210-1-1.

Still continuing with the above illustration, the asset management application 204 may also configure the breach boundary security group 210-1-2 in a similar manner as discussed with respect to breach boundary security group 210-1-1, so that a JIT account that is a member of the breach boundary security group 210-1-2 may access, in accordance with a set of access permissions associated with the breach boundary security group 210-1-2, the server devices 140-1-4, 140-1-5, 140-1-6. In implementations where server devices 140-1-1 to 140-1-6 are virtual server devices implemented using one or more virtual machines residing on server devices 140-i-j, the asset management application 204 may automatically configure the virtual server devices during the provisioning process (e.g., creation and/or deployment) of the virtual server devices.

It may be appreciated that while only two breach boundary security groups 210-1-1 and 210-1-2 are illustrated in various embodiments, the asset management application 204 may be configured to create a plurality of groups (e.g., remote access group, debugger group, etc.) for one or more roles, where each group may be associated with set of access permissions (e.g., remote access to the one or more resources and/or assets, debugging of the one or more resources and/or assets, etc.) associated with the roles, so that a JIT account may be a member of multiple groups in a nested manner to achieve Role Based Access Control (RBAC). The embodiments are not limited in this context.

To ensure that a proper set of access permissions are granted or provided to a provisioned JIT account, the account provisioning component 120 of the admin management application 114 may be further configured to identify a directory service server device implementing the appropriate breach boundary security groups 210-m-n and identify one or more breach boundary security groups 210-m-n configured to grant access to one or more resources and/or assets by utilizing network interconnect 112 and one or more APIs of the directory service applications (not shown) of the one or more directory service server devices 130-l. Once the appropriate directory service server device and one or more breach boundary security groups 210-m-n have been identified, the account provisioning component 120 may be configured to associate the provisioned JIT account with the identified breach boundary security group.

In one embodiment, the account provisioning component 120 may associate the JIT account with breach boundary security groups 210-m-n by adding the JIT account to one or more breach boundary security groups 210-m-n as members so that the JIT account may be granted a set of access permissions to access the one or more resources and/or assets within a breach boundary associated with the breach boundary security group. In some embodiments, the account provisioning component 120 may be further configured limit the number of breach boundary security groups 210-m-n a JIT account may be associated with (e.g., each JIT account may only be associated with a single breach boundary security group) in order to further limit the scope of impact an attacker may cause using a compromised JIT account.

By way of illustration, assume that the requested role and scope information received from client 102-1 for a JIT account with elevated access permissions includes a remote user and debugger for breach boundary 138-1-1 and the JIT account has been provisioned, the account provisioning component 120 may first identify the directory service server device 130-1 among the one or more directory service server devices 130-l that is implementing the breach boundary 138-1-1 utilizing breach boundary security group 210-1-1. The account provisioning component 120 may also identify the breach boundary security group 210-1-1 as the breach boundary security group configured to grant a set of access permissions to server devices 140-1-1, 140-1-2, 140-1-3. The account provisioning component 120 may further associate by adding the provisioned JIT account to at least the identified breach boundary security group 210-1-1 in order to grant the provisioned JIT account a set of access permissions to server devices 140-1-1, 140-1-2, 140-1-3. It may be appreciated that the account provisioning component 120 may also associate by adding the provisioned JIT account to other groups (e.g., remote user group, debugger groups, etc.) in order to grant access permissions as remote user and debugger so that the provisioned JIT account may be used by client 102-1 to perform remote debugging on server devices 140-1-1, 140-1-2, 14-1-3.

In various embodiments, the admin management application 114 may further comprise the account lifetime component 124. The account lifetime component 124 may be generally arranged to manage the lifetime associated with each JIT account based on the JIT account lifetime information or a predefined JIT account lifetime information. The account lifetime component 124 may be further arranged to disable and/or remove one or more JIT accounts after a period of time has elapsed. The JIT account lifetime information may include, but is not limited to, a specific time or elapse of time of when the JIT account expires and becomes disabled and a specific time or elapse of time of when the JIT account is removed.

It may be appreciated that in some embodiments, the JIT account lifetime information may be determined and/or derived based on the JIT account request information received from one or more clients 102-a via client devices 104-b for a given implementation. In other embodiments, the JIT account lifetime information may be determined and/or derived based on the one or more roles as indicated by the JIT account role and scope information, where some roles (e.g., a remote user and a debugger) may have an associated JIT account lifetime of 2 hours while other roles (e.g., a backup operator) may have an associated life time of 4 hours. The embodiments are not limited in this context.

In one embodiment, the account lifetime component 124 may be further configured to receive one or more access approval requests from one or more directory service server devices 130-l via network interconnect 112, when one or more clients 102-a access the one or more resources and/or assets managed by the one or more directory service server devices 130-l. The account lifetime component 124 may be further configured to automatically approve or allow the one or more clients 102-a to access the one or more resources and/or assets managed by the respective directory service server devices 130-l, when the lifetime of the JIT account has not expired.

Alternatively, the account lifetime component 124 may be configured to automatically deny the one or more clients 102-a any access to the one or more resources and/or assets managed by the respective directory service server devices 130-l, when the lifetime of the JIT account has expired. Additionally, in one embodiment, the account lifetime component 124 may also be configured to disable the JIT account and/or disassociate the JIT account from the one or more breach boundary security groups. For example, the account lifetime component 124 may disable the JIT account by denying all access approval requests and generate a new authentication token without providing the newly generated authentication token to clients 102-a. The account lifetime component may also disassociate the JIT account by removing the JIT account from membership in the one or more breach boundary security groups.

In one exemplary embodiment, the lifetime of the JIT account may start from the time when the JIT account is provisioned (e.g., provisioned by the account provisioning component 120) and ends at the specified time or elapse of time based on the JIT account lifetime information. Alternatively, the lifetime of the JIT account may start from the time when the JIT account is first utilized (e.g., a client attempts to access a resource and/or asset) and ends at the specified time or elapse of time based on the JIT account lifetime information. The exemplary embodiments are not limited in this context.

Additionally or alternatively, the account lifetime component 124 may be further configured to periodically scan the JIT accounts datastore 124 for any enabled JIT accounts and disable any JIT accounts with lifetimes that have expired based on the JIT account lifetime information. In some embodiments, a JIT account that becomes disabled will also immediately terminate (e.g., a forced log off) any JIT accounts currently in use and their associated active actions or tasks. To ensure that one or more directory server devices 130-l managing the one or more resources and/or assets are properly synchronized with the JIT accounts datastore 126, the account lifetime component 124 may be further configured to communicate via network interconnect 112 and one or more APIs of the directory service application 110 to update JIT account lifetime information of the JIT accounts and/or disable any JIT accounts with expired lifetimes.

Additionally or alternatively, the account lifetime component 124 may be further configured to periodically scan the JIT accounts datastore 124 for any disabled JIT accounts and remove any disabled JIT accounts that have not been utilized for a predefined period of time (e.g., inactive JIT accounts) based on the JIT account lifetime information. To ensure that one or more directory server devices 130-l managing the one or more resources and/or assets are properly synchronized, the account lifetime component 124 may be further configured to remove those disabled JIT accounts by communicating via network interconnect 112 and one or more APIs of the one or more directory service applications (not shown) of the one or more directory server devices 130-l.

By way of illustration, assume that the client 102-1 requested for a JIT account with elevated access permissions as a remote user and a debugger for breach boundary 138-1-1 so that the JIT account request information comprises a requested lifetime information indicating the requested lifetime for a JIT account is 4 hours. Further assume that a JIT account has been provisioned at 12:00 PM to the client 102-1 having an JIT account lifetime information indicating that the provisioned JIT account lifetime is 4 hours and the lifetime for the provisioned JIT account starts from the time when the JIT account is provisioned, which is 12:00 PM, so that the lifetime of the JIT account ends at 4:00 PM. In one exemplary embodiment, the account lifetime component 124 may grant access approval request from directory service server device 130-1, when the client 102-1 attempts to remotely access server device 140-1-1 (e.g., using Remote Desktop Protocol (RDP)) using the provisioned JIT account via client device 104-1 and network interconnect 112 before 4:00 PM.

Continuing with the above example, in another exemplary embodiment, the account lifetime component 124 may reject an access approval request from directory service server device 130-1, when the client 102-1 attempts to remotely access server device 140-1-1 (e.g., using Remote Desktop Protocol (RDP)) using the provisioned JIT account after 4:00 PM. The account lifetime component 124 may also automatically deny any access to server device 140-1-1 and disable the provisioned JIT account after 4:00 PM. Additionally, the account lifetime component 124 may disassociate the provisioned JIT account from breach boundary security group 210-1-1 by removing membership of the provisioned JIT account from breach boundary security group 210-1-1. Further, the account lifetime component 124 may also automatically scan, determine, and remove the disabled JIT account as an inactive JIT account when the disabled JIT account has not been utilized by the client 102-1 after a continuous period (e.g., a day, a week, a month, a year, etc.) of inactivity (e.g., no log on).

At least one technical advantage that may be realized through the association of each JIT account with a lifetime is that an attacker will be limited to gaining access to any JIT account only when the JIT account is still enabled. Additionally, even when a JIT account is compromised during the time when the JIT account is still enabled, the ability for an attacker to do harm will be time limited based at least partially on the lifetime associated with the compromised JIT account. Another technical advantage that may be realized is the reduction of the effectiveness associated with a "pass the hash attack," because an attacker that gains access to one or more authentication tokens for the JIT accounts (e.g., hashed and/or salted passwords for the JIT account) must also find a JIT account that is currently enabled. Yet another technical advantage that may be realized is the reduction of the attack surface or attack vector by the removal of one or more inactive JIT accounts. Still a further technical advantage that may be realized is that any increase in attack surface or attack vector associated with the increase in the number of provisioned JIT accounts may be mitigated, when the JIT accounts are provisioned with limited lifetime (e.g., restricted to 4 hours), limited role (e.g., restricted to a single role), limited role type (e.g., restricted to debugger), and limited scope (e.g., restricted to a single breach boundary). Additionally, when the limited lifetime, limited role, limited role type, and limited scope is combined with breach boundaries that are arranged to be mutually exclusive or non-overlapping, any lateral movement (e.g., movement between breach boundaries) by an attacker having access to a compromised JIT account will be greatly restricted or even rendered impossible.

Figure 3:
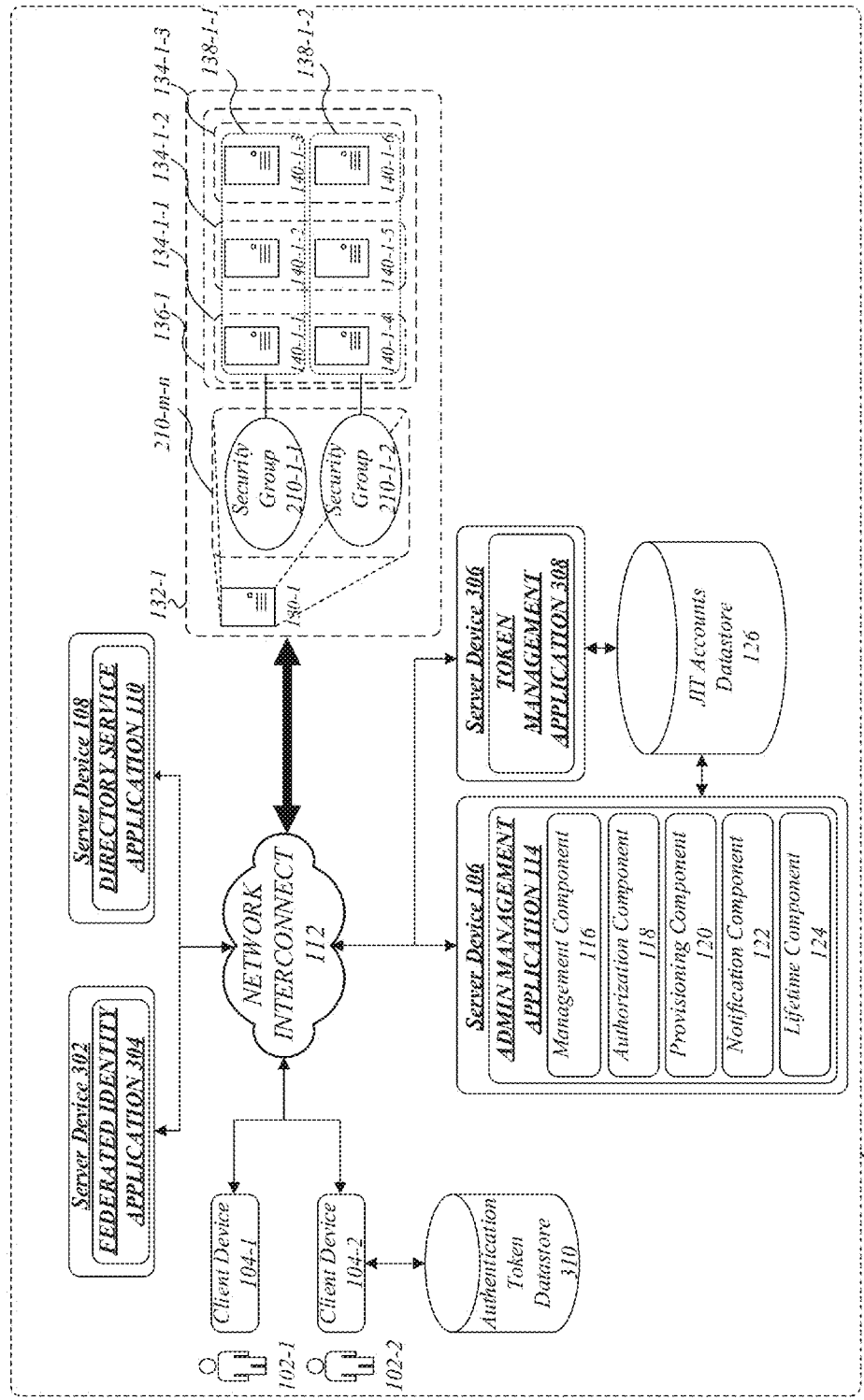
FIG. 3 illustrates yet another embodiment of the JIT account provisioning system for authorizing clients and managing authentication tokens associated with JIT accounts.

FIG. 3 illustrates another embodiment for the JIT account provisioning system 100. In various embodiments of the JIT account provisioning system 100 may further comprise server devices 302 and 306 which may be generally arranged to execute, among other applications, federated identity application 304 and authentication token management application 308, respectively. Additionally, at least one client device may be further arranged to store one or more authentication tokens associated with JIT accounts in an authentication token datastore 310.

In various embodiments the federated identity application 304 may be generally arranged to provide multifactor authentication (e.g., two factor authentication utilizing a smart card, a password/pin, and/or fingerprint) utilizing one or more authentication protocols (e.g., Kerberos protocol). The federated identity application 304 may also be generally arranged to provide security token service and issue one or more security tokens (e.g., a Security Assertion Markup Language (SAML) token) to one or more clients 102-a and/or claim enabled applications so that the one or more claim enabled application may identify a client without directly having to receive and/or process the client account information (e.g., user-principal-name (UPN), account identifier, account password or hash derivatives thereof, account domain, smart card certificates, etc.) associated with the one or more clients 102-a. Exemplary federated identity applications 304 may include, but are not limited to, MICROSOFT Active Directory Federation Services (AD FS), MICROSOFT Federation Gateway, or any other federated identity service providers configured to issue security tokens comprising claims that assert the identity of a previously authenticated client.

In various embodiments, the account management component 116 of the admin management application 114 may be further configured to receive security tokens issued by federated identity application 304 from one or more client devices 104-b and identify the one or more clients 102-a requesting elevated access permissions based on the received security tokens. The received security tokens may also comprise the client account information associated with one or more clients 102-a and enable the account authorization component 118 to determine the client account role and scope information for one or more clients 102-a.

In various embodiments the authentication token management application 308 may be generally arranged to manage authentication tokens (e.g., passwords) of one or more JIT accounts associated with a client. In one embodiment, authentication token management application 308 may be configured to receive security tokens issued by federated identity application 304 from one or more client devices 104-b and identify the one or more clients 102-a.

In one embodiment, the authentication token management application 308 may be further configured to provide the one or more clients 102-a a collection of JIT accounts and their associated JIT account information (e.g., JIT account lifetime information, JIT account role and scope information, JIT account identifier, etc.) for management, in response to requests of one or more clients 102-a to obtain a collection of JIT accounts associated with the one or more clients 102-a. The authentication token management application 308 may be further configured to associate an authentication token for a one or more JIT accounts received from the one or more clients 102-a or automatically generate and associate one or more authentication tokens for one or more JIT accounts.

In another embodiment, the authentication token management application 308 may be further configured to store the received or generated authentication token for each JIT account in the JIT accounts datastore 126. The authentication token management application 308 may be configured to update the one or more JIT accounts with received or generated authentication token by utilizing the network interconnect 112 and one or more APIs of the directory service applications (not shown) of the directory service server devices 130-l so that the one or more clients 102-a may be able to access the one or more resources and/or assets managed by the directory service server devices 130-l.

In a further embodiment, the authentication token management application 308 may also provide the authentication token to the one or more clients 102-a via network interconnect 112 and client devices 104-b over a secure connection (e.g., trusted and encrypted connection) utilizing one or more secure communications protocols (e.g., Hypertext Transfer Protocol Secure (HTTPS)). It may be appreciated that at least some of the client devices 104-b, such as, for example, client device 104-2 may be communicatively coupled to an authentication token datastore 310 for securely storing at least the JIT account identifiers and their associated authentication tokens in an encrypted format utilizing one or more encryption algorithms (e.g., Twofish symmetric key block cipher). Thus, in some embodiments, the client device 104-2 may be configured to automatically encrypt and store any authentication tokens provided to the client 102-2 in the authentication token datastore 310 and allow the client 102-2 to later retrieve the previously stored JIT account identifiers and their associated authentication tokens for accessing one or more resources and/or assets.

In implementations where the authentication token for a JIT account are plaintext passwords, the authentication token management application 308 may be configured to generate a random password having varying complexity requirements such as, for example, at least two different character classes (e.g., numbers, letters, and/or symbols) coupled with a minimum character length (e.g., 8 characters minimum). The authentication token management application 308 may be further configured to hash and/or salt generated or client provided plaintext passwords so that the plaintext passwords cannot be recovered when one or more directory service server devices 130-l and/or one or more resources and/or assets are compromised by an attacker. However, it may be appreciated that even though the plaintext passwords are hashed and/or salted the clients 102-a may continue to utilize the JIT accounts to access the one or more resources and/or assets using the plaintext passwords provided to the clients 102-a.

To facilitate the client in setting or generating authentication tokens, the notification component 122 of the admin management application 114 may be further configured to provide, in one or more notification messages, a reference to the authentication token management application 308 so that one or more clients 102-a may access the authentication management application 308 to set and/or generate one or more authentication tokens for one or more provisioned JIT accounts.

By way of illustration, assume that a JIT account has been provisioned for client 102-2 for breach boundary 138-1-2, the notification component 122 may provide, among other information, a JIT account identifier associated with the provisioned JIT account and a URL for the token management application 308 via email to the client 102-2. The client 102-2 may then utilize one or more applications and/or components of the client device 104-2 (e.g., a web browser of a computing device) to access the token management application 308 to retrieve a collection of JIT accounts including the provisioned JIT account associated with the client 102-2. The client 102-2 may further set and/or generate a random plaintext password for the provisioned JIT account, and subsequently store the JIT account identifier and the associated random plaintext password in the authentication token datastore 310. To access or service the server devices 140-1-4, 140-1-5, 140-1-busing the provisioned JIT account, the client 102-2 via client device 104-2 may then retrieve the JIT account identifier and the associated random plaintext password stored in the authentication token datastore 310 and use the retrieved JIT account identifier and associated random plaintext password to access server device 140-1-4.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be needed for a novel implementation.

Figure 4A:
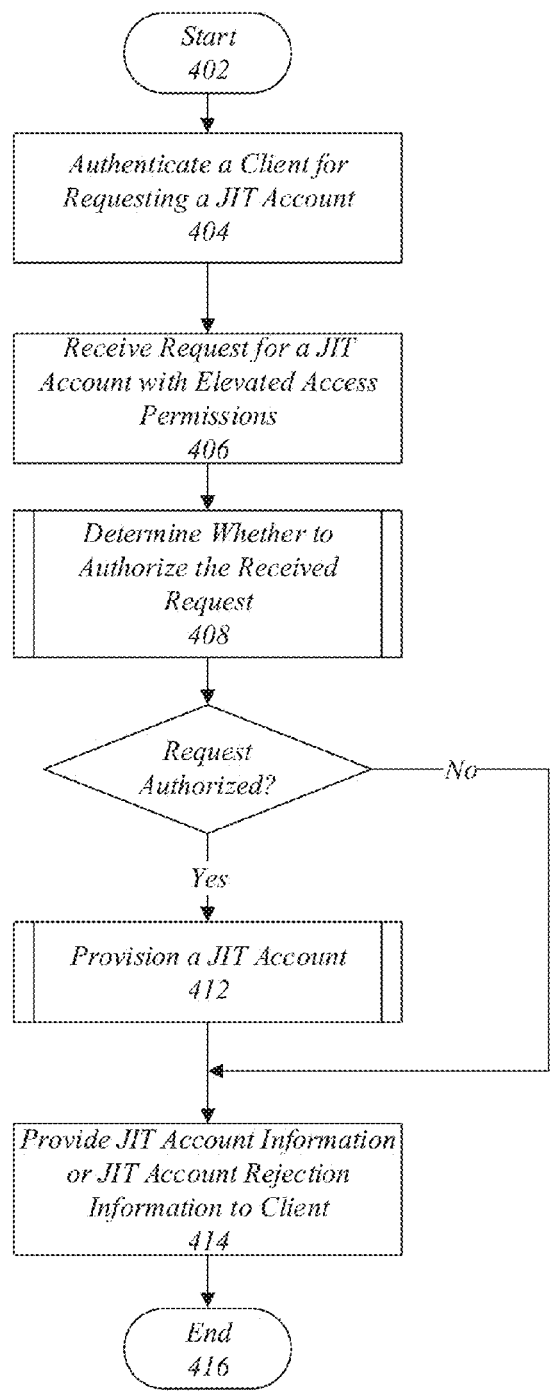
FIG. 4A illustrates an embodiment of a logic flow for provisioning JIT accounts.

FIG. 4A illustrates one embodiment of a logic flow 400. The logic flow 400 may be representative of some or all of the operations executed by one or more embodiments described herein.

In the illustrated embodiment shown in FIG. 4A, the logic flow 400 may start at block 402 and may authenticate a client for requesting a JIT account with elevated access permissions at block 404. For example, the account management component 116 may authenticate client 102-1 having an associated client account for requesting one or more JIT accounts with elevated access permissions. The account management component 116 may also enable the client 102-1 to request via client device 104-1 the JIT account with elevated access permissions to access or service server device 140-1-1 that requires access permissions higher than the client account.

The logic flow 400 may receive request for a JIT account with elevated access permissions at block 406. For example, the account management component 116 may receive a request from client 102-1 having an associated client account via client device 104-1 for a JIT account with a set of elevated access permissions to access or service the server device 140-1-1.

The logic flow 400 may determine whether to authorize the received request at block 408. For example, the account authorization component 118 may determine whether to authorize the request for a JIT account based at least partially on the client account information associated with the client account of client 102-1 and the JIT account request information received from the client account associated with client 102-1 via client device 104-1.

The logic flow 400 may provision a JIT account when the request is authorized at block 412. For example, the account provisioning component 120 may provision a JIT account with elevated access permissions to enable client 102-1 to access server device 140-1-1, when the request for a JIT account was authorized by the account authorization component 118.

The logic flow 400 may provide JIT account information or provide JIT account rejection information at block 414 and end at block 416. For example, the account notification component 122 may provide JIT account information associated with the provisioned JIT account having elevated access permissions to the client 102-1, when the request for a JIT account was authorized. Alternatively, when the request for a JIT account was not authorized by the account authorization component 118, the account notification component 122 may provide JIT account rejection information to client 102-1 via client device 104-1, where the JIT account rejection information may indicate the one or more reasons for the rejection. The embodiments are not limited to these examples.

Figure 4B:
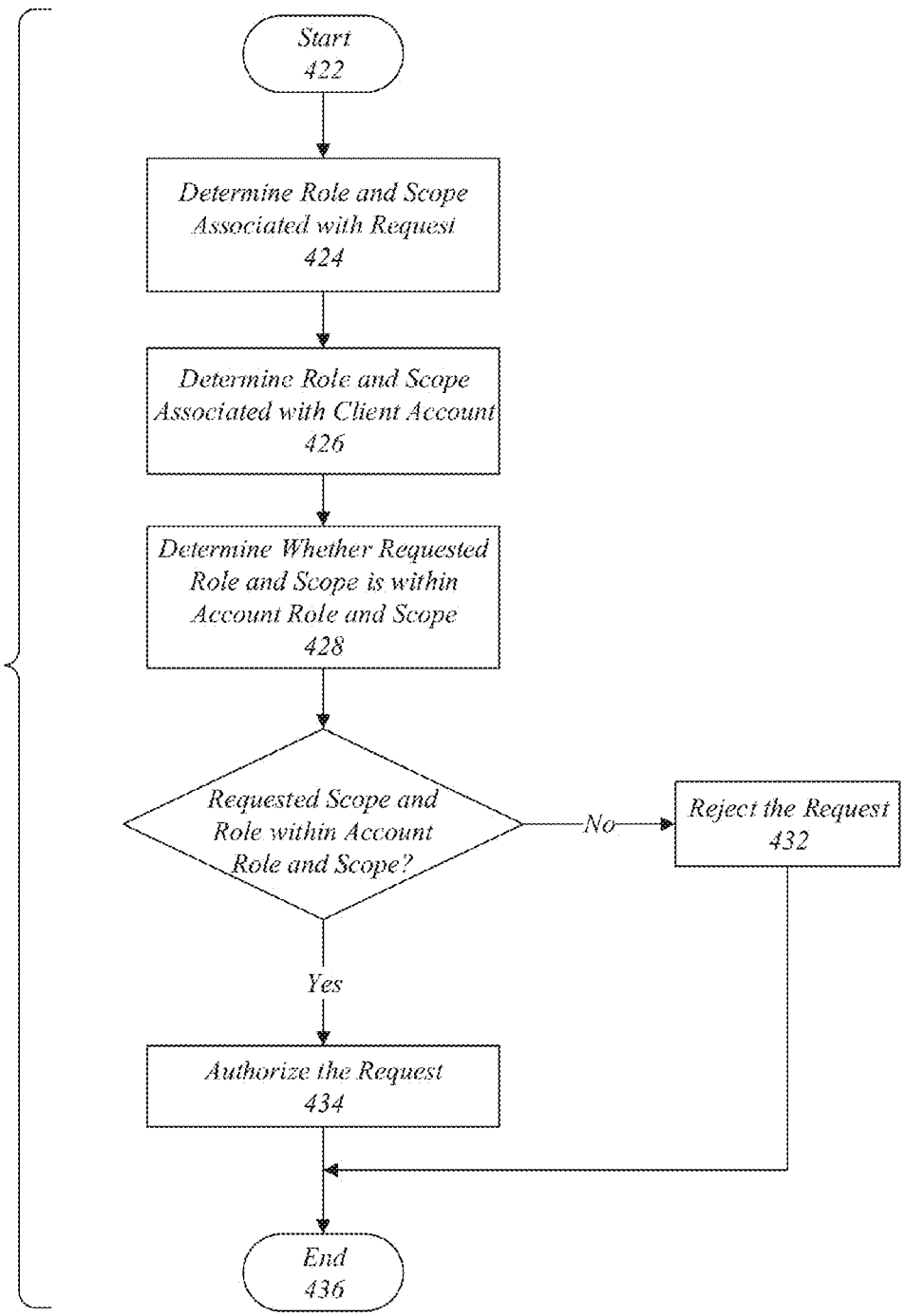
FIG. 4B illustrates an embodiment of a logic flow for authorizing received requests for JIT accounts having elevate access permissions.

FIG. 4B illustrates one embodiment of a logic flow 420 and in particular, block 408 of FIG. 4A. The logic flow 420 may be representative of some or all of the operations executed by one or more embodiments described herein.

In the illustrated embodiment shown in FIG. 4B, the logic flow 420 may start at block 422 and may determine role and scope associated with request at block 424. For example, the account authorization component 118 may determine the roles (e.g., a remote user and a debugger) and scope (breach boundary 138-1-1) associated with the request for a JIT account based at least partially on the JIT account request information received from client 102-1 via client device 104-1.

The logic flow 420 may determine role and scope associated with client account at block 426. For example, the account authorization component 118 may determine the roles (e.g., remote user and debugger) and scope (forest 132-1) associated with the client account of the client 102-1 based at least partially on the client account information associated with the client 102-1. The account authorization component 118 may receive the client account information for the client 102-1 from directory service application 110 and/or from a security token provided by the client 102-1 via client device 104-1.

The logic flow 420 may determine whether requested role and scope is within account role and scope at block 428. For example, the account authorization component 118 may determine the whether the requested role and scope is within or in comport with the account role(s) and scope by comparing the requested role(s) and scope with the account role(s) and scope.

The logic flow 420 may reject the request when requested role and scope is not within account role and scope at block 432 and end at block 436. For example, the account authorization component 118 may reject the request when the requested roles include remote user and debugger and the request scope includes breach boundary 138-1-1 while the account role includes debugger but not remote user and the account scope includes forest 132-2.

The logic flow 420 may authorize the request when requested role and scope is within account role and scope at block 432 and end at block 436. For example, the account authorization component 118 may authorize the request when the requested roles include remote user and debugger and the request scope includes breach boundary 138-1-1 while the account roles also includes remote user and debugger and the account scope includes forest 132-1, which includes breach boundary 138-1-1. The embodiments are not limited to these examples.

Figure 4C:
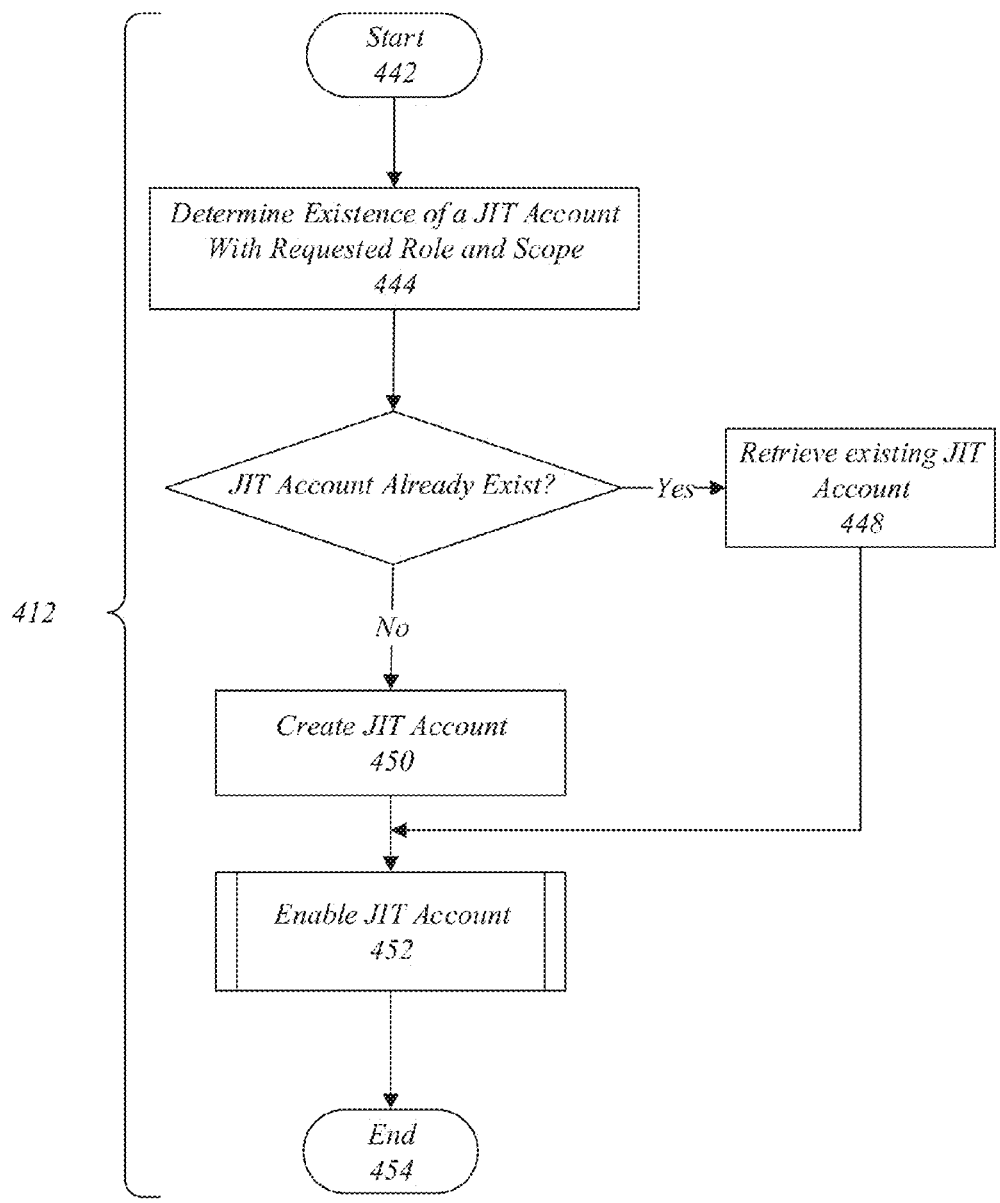
FIG. 4C illustrates an embodiment of a logic flow for enabling provisioned JIT accounts.

FIG. 4C illustrates one embodiment of a logic flow 440 and in particular, block 412 of FIG. 4A. The logic flow 440 may be representative of some or all of the operations executed by one or more embodiments described herein.

In the illustrated embodiment shown in FIG. 4C, the logic flow 440 may start at block 442 and may determine existence of a JIT account with requested role and scope at block 444. For example, the account provisioning component 120 may determine the existence of the JIT account with requested role and scope and a set of elevated access permissions by searching and/or scanning the JIT accounts datastore 126 and comparing the requested role and scope information with the JIT account role and scope information of existing JIT accounts. The account provisioning component 120 may further determine a substantial match between the JIT account role and scope information associated with an existing JIT account and the requested role and scope information received from client 102-1.

The logic flow 440 may retrieve existing JIT account when the JIT account already exists with the requested role and scope for that client at block 448. For example, the account provisioning component 120 may retrieve the JIT account information associated with the previously created JIT account from the JIT account datastore 126 for client 120-1, when the account provisioning component 120 determines that the JIT account having the requested role and scope already exists for client 120-1.

The logic flow 440 may create JIT account when the JIT account with the requested role and scope does not already exist for that client at block 450. For example, the account provisioning component 120 may create the JIT account for the client 102-1 to access the server device 140-1-1 when an existing JIT with the request role and scope was not found in the JIT accounts datastore 126.

The logic flow 440 may enable the JIT at block 452 and end at block 454. For example, once the JIT account has been created or retrieved, the account provisioning component 120 may enable the JIT account with a set of elevated access permissions so that the client 102-1 may use the enabled JIT account to access or service the server device 140-1-1. The embodiments are not limited to these examples.

Figure 4D:
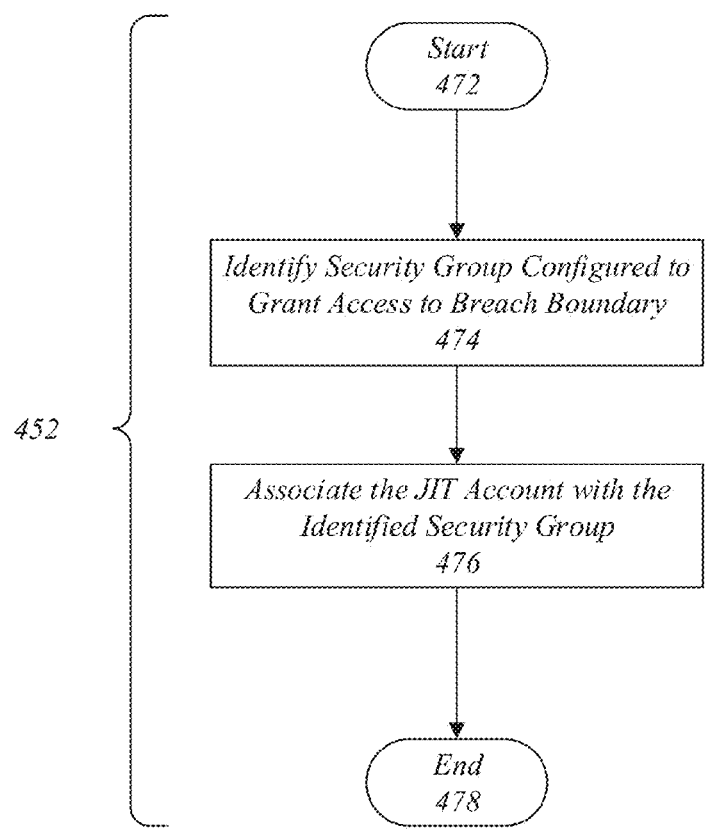
FIG. 4D illustrates an embodiment of a logic flow for configuring access permissions associated with JIT accounts.

FIG. 4D illustrates one embodiment of a logic flow 470 and in particular, block 452 of FIG. 4C. The logic flow 470 may be representative of some or all of the operations executed by one or more embodiments described herein.

In the illustrated embodiment shown in FIG. 4D, the logic flow 470 may start at block 472 and may identify security group configured to grant access to breach boundary at block 474. For example, assuming that the requested scope for the JIT account includes breach boundary 138-1-1, the account provisioning component 120 may identify breach boundary security group 210-1-1 as being configured to grant access to breach boundary 138-1-1 by utilizing network interconnect 112 and one or more APIs of the directory service application (not shown) of the directory service server device 130-1.

The logic flow 470 may associate the JIT account with the identified security group at block 476 and end at block 478. For example, once the breach boundary security group 210-1-1 has been identified, the account provisioning component 120 may associate the JIT account with the breach boundary security group 210-1-1 by adding that JIT account to the breach boundary security groups 210-1-1 as a member so that the JIT account may be granted a set of access permissions to enable access to the server devices 140-1-1, 140-1-2, 140-1-3 within a breach boundary 138-1-1. The embodiments are not limited to these examples.

Figure 4E:
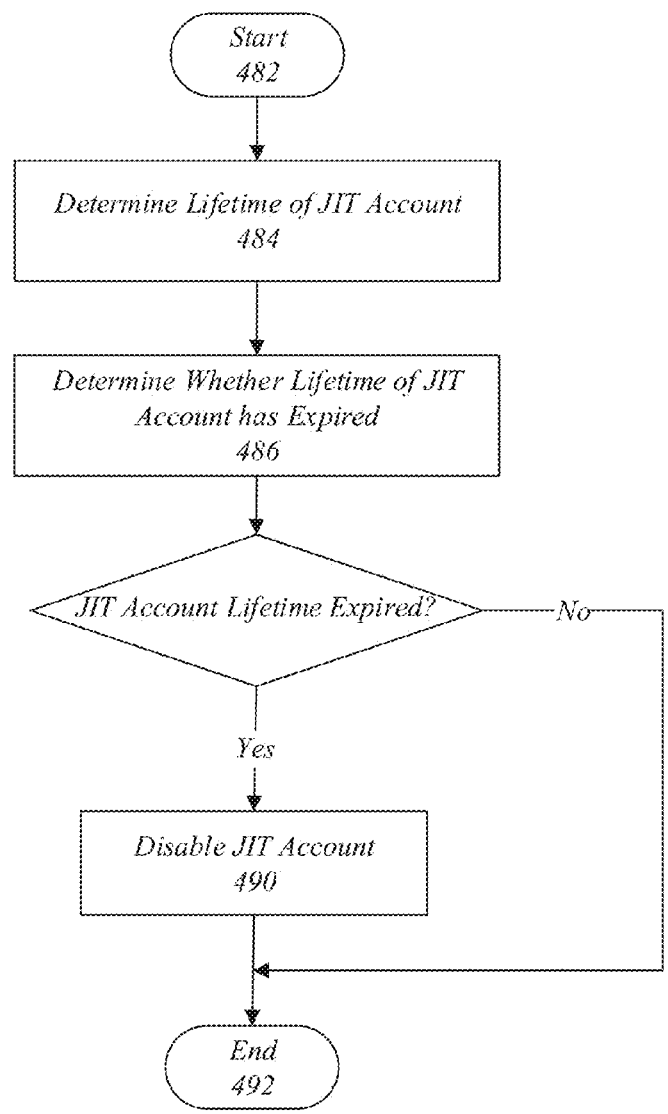
FIG. 4E illustrates an embodiment of a logic flow for managing lifetimes associated with JIT accounts.

FIG. 4E illustrates one embodiment of a logic flow 480. The logic flow 478 may be representative of some or all of the operations executed by one or more embodiments described herein.

In the illustrated embodiment shown in FIG. 4E, the logic flow 480 may start at block 482 and may determine lifetime of JIT account at block 484. For example, the account lifetime component 124 may determine lifetime of a JIT account based on the JIT account request information received from client 102-1 via client device 104-1. Alternatively, the account lifetime component 124 may determine lifetime of JIT account based on the JIT account role and scope information.

The logic flow 480 may determine whether lifetime of JIT account has expired at block 484. For example, assume that the JIT account lifetime information indicates that the lifetime of a JIT account provisioned to access server device 140-1-1 is 2 hours and the lifetime for the JIT account starts from the time when the JIT account is provisioned which was at 1:00 PM. The account lifetime component 124 may determine the lifetime of JIT account has expired when the account lifetime component 124 receives an access approval request to access server device 140-1-1 at 3:15 PM from directory service server device 130-1. Alternatively, the account lifetime component 124 may determine the lifetime of JIT account has not yet expired when the account lifetime component 124 receives an access approval request to access server device 140-1-1 at 1:30 PM from directory service server device 130-1.

The logic flow 480 may disable JIT account when JIT account lifetime has expired at block 490 and end at block 492. For example, assume that the JIT account lifetime information indicates that the lifetime of a JIT account is 2 hours and that 2 hours has already lapsed so that the lifetime of the JIT account has already expired. The account lifetime component 124 may then automatically disable the JIT account by deny any access approval requests to server device 140-1-1 received from directory service server device 130-1 when client uses the expired JIT account to access the server device 140-1-1. The embodiments are not limited to these examples.

Figure 5:
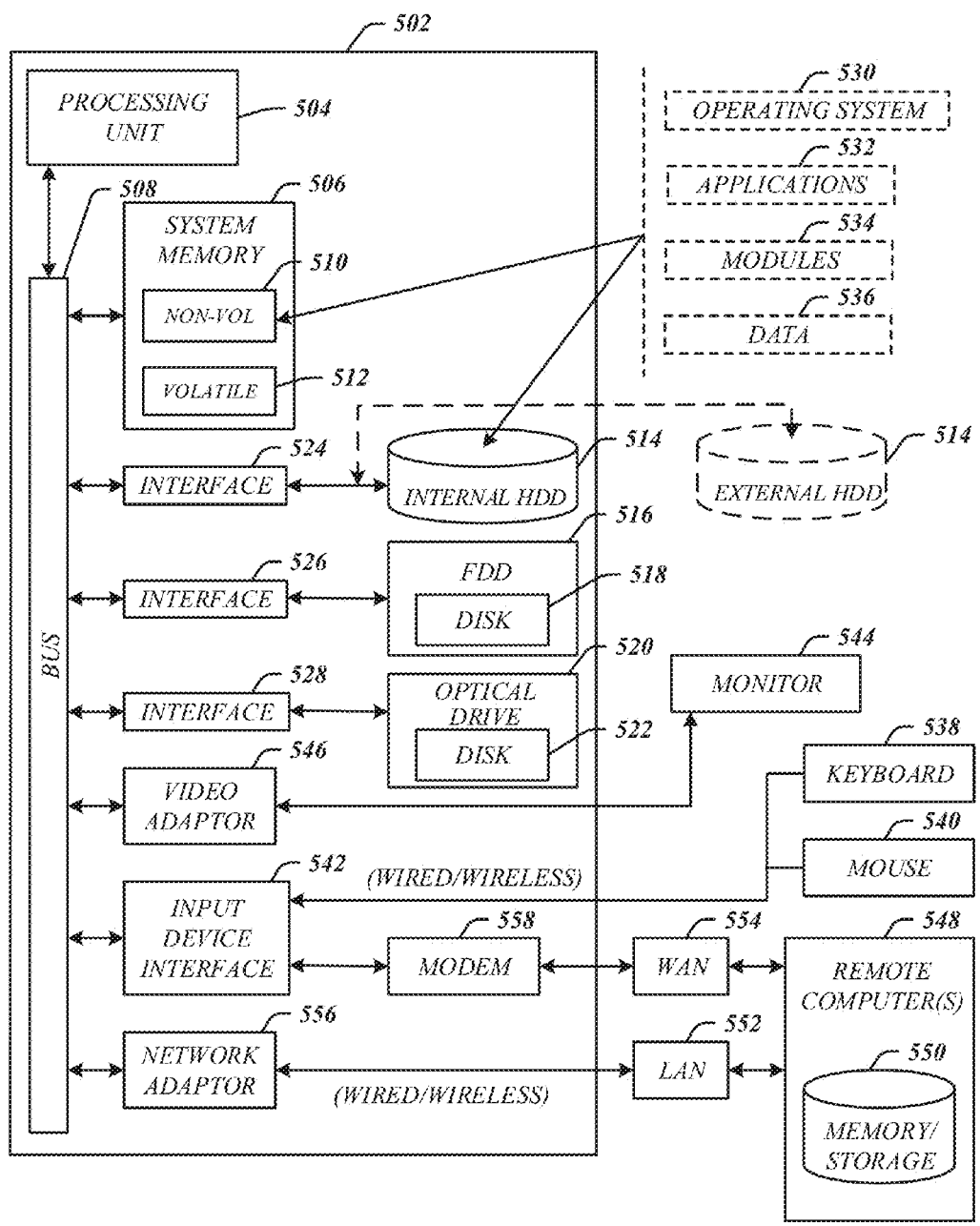
FIG. 5 illustrates an embodiment of a computing architecture.

FIG. 5 illustrates an embodiment of an exemplary computing architecture 500 suitable for implementing various embodiments as previously described. In one embodiment, the computing architecture 500 may comprise or be implemented as part of the client devices and/or server devices. The embodiments are not limited in this context.

As used in this application, the terms "system" and "component" are intended to refer to a computer-related entity, either hardware, a combination of hardware and software, software, or software in execution, examples of which are provided by the exemplary computing architecture 500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 500 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 500.

As shown in FIG. 5, the computing architecture 500 comprises a processing unit 504, a system memory 506 and a system bus 508. The processing unit 504 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 504.

The system bus 508 provides an interface for system components including, but not limited to, the system memory 506 to the processing unit 504. The system bus 508 can be any of several types of bus structure that may further interconnect to a memory bus (with or without a memory controller), a peripheral bus, and a local bus using any of a variety of commercially available bus architectures. Interface adapters may connect to the system bus 508 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 500 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 5, the system memory 506 can include non-volatile memory 510 and/or volatile memory 512. A basic input/output system (BIOS) can be stored in the non-volatile memory 510.

The computer 502 may include various types of computer-readable storage media in the form of one or more lower speed memory units, including an internal (or external) hard disk drive (HDD) 514, a magnetic floppy disk drive (FDD) 516 to read from or write to a removable magnetic disk 518, and an optical disk drive 520 to read from or write to a removable optical disk 522 (e.g., a CD-ROM or DVD). The HDD 514, FDD 516 and optical disk drive 520 can be connected to the system bus 508 by a HDD interface 524, an FDD interface 526 and an optical drive interface 528, respectively. The HDD interface 524 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 510, 512, including an operating system 530, one or more application programs 532, other program modules 534, and program data 536. In one embodiment, the one or more application programs 532, other program modules 534, and program data 536 can include, for example, the various applications and/or components of the system 100.

A user can enter commands and information into the computer 502 through one or more wire/wireless input devices, for example, a keyboard 538 and a pointing device, such as a mouse 540. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 504 through an input device interface 542 that is coupled to the system bus 508, but can be connected by other interfaces such as a parallel port, IEEE 1394 serial port, a game port, a USB port, an IR interface, and so forth.

A monitor 544 or other type of display device is also connected to the system bus 508 via an interface, such as a video adaptor 546. The monitor 544 may be internal or external to the computer 502. In addition to the monitor 544, a computer typically includes other peripheral output devices, such as speakers, printers, and so forth.

The computer 502 may operate in a networked environment using logical connections via wire and/or wireless communications to one or more remote computers, such as a remote computer 548. The remote computer 548 can be a workstation, a server computer, a router, a personal computer, portable computer, microprocessor-based entertainment appliance, a peer device or other common network node, and typically includes many or all of the elements described relative to the computer 502, although, for purposes of brevity, only a memory/storage device 550 is illustrated. The logical connections depicted include wire/wireless connectivity to a local area network (LAN) 552 and/or larger networks, for example, a wide area network (WAN) 554. Such LAN and WAN networking environments are commonplace in offices and companies, and facilitate enterprise-wide computer networks, such as intranets, all of which may connect to a global communications network, for example, the Internet.

When used in a LAN networking environment, the computer 502 is connected to the LAN 552 through a wire and/or wireless communication network interface or adaptor 556. The adaptor 556 can facilitate wire and/or wireless communications to the LAN 552, which may also include a wireless access point disposed thereon for communicating with the wireless functionality of the adaptor 556.

When used in a WAN networking environment, the computer 502 can include a modem 558, or is connected to a communications server on the WAN 554, or has other means for establishing communications over the WAN 554, such as by way of the Internet. The modem 558, which can be internal or external and a wire and/or wireless device, connects to the system bus 508 via the input device interface 542. In a networked environment, program modules depicted relative to the computer 502, or portions thereof, can be stored in the remote memory/storage device 550. It will be appreciated that the network connections shown are exemplary and other means of establishing a communications link between the computers can be used.

The computer 502 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments need more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
 a processor circuit; and
 a server application for execution by the processor circuit, the server application comprising:
  an account management component to receive a request from a client having a first account via a client device for creating a second account to access a server device in a set of server devices wherein the set of server devices is segmented into a plurality of breach boundaries and each breach boundary of the plurality of breach boundaries is associated with a single security group configured to grant access to a set of server devices in each breach boundary,
  an account authorization component to authorize the request for creating the second account based on security information associated with the first account, identify a security group configured to grant access to a breach boundary comprising the server device, and associate the second account with the security group to enable the second account access to the server device in the breach boundary,
  an account provisioning component to create the second account to enable the client device to access the server device, and
  an account notification component to provide account information associated with the second account to the client device.

2. The apparatus of claim 1, wherein the account authorization component is to further:
 determine a scope and a role associated with the request, determine a scope and a role associated with the first account based on the account information associated with the first account, and authorize the request based at least partially on the scope and the role of the first account.

3. The apparatus of claim 2, wherein the account provisioning component is to further:
 determine existence of the second account with a set of elevated access permissions based on the role and scope associated with the request, create the second account for access to the server device, when the second account does not exist, and enable the second account for access to the server device.

4. The apparatus of claim 1, wherein the request to elevate access permissions is associated with a lifetime, the lifetime comprises a defined period of time to enable access to the server device, and the second account is automatically disabled at the end of the defined period of time.

5. The apparatus of claim 1, wherein the server device requires a set of access permissions higher than a set of access permissions associated with the first account and the second account has a set of elevated access permissions higher than the set of access permissions associated with first account.

6. A computer-implemented method, comprising:
 receiving a request from a client having a first account via a client device for creating a second account with a set of access permissions to access a server device in a set of server devices wherein the set of server devices is segmented into a plurality of breach boundaries and each breach boundary of the plurality of breach boundaries is associated with a single security group configured to grant access to a set of server devices in a breach boundary;
 authorizing, by circuitry, the request for creating the second account based at least partially on an authentication token associated with the first account;
 provisioning the second account to enable the client device to access the server device wherein provision the second account further comprises identifying a security group configured to grant access to breach boundary comprising the server device and associating the second account with the security group to enable the second account access to the server device in the breach boundary; and
 providing account information associated with the second account to the client device, the account information corresponding to authentication and authorization information of the client.

7. The computer-implemented method of claim 6, wherein the authorizing the request to elevate permission further comprises:
 determining a request scope and a role associated with the request;
 determining an account scope and a role associated with the first account based on the account information associated with the first account; and
 authorizing the request based on the scope and the role of the first account.

8. The computer-implemented method of claim 7, wherein the provisioning of the second account further comprises:
 determining existence of the second account with a set of access permissions based on the role and scope associated with the request;
 creating the second account for access to the server device, when the second account does not exist; and
 enabling the second account for access to the server device.

9. The computer-implemented method of claim 6, wherein the request to elevate access permissions is associated with a lifetime, the lifetime comprises a defined period of time to enable access to the server device, and the second account is automatically disabled at the end of the defined period of time.

10. The computer-implemented method of claim 6, wherein the server device requires a set of access permissions higher than a set of access permissions associated with the first account and the second account has a set of elevated access permissions higher than the set of access permissions associated with first account.

11. A computer-readable storage hardware comprising instructions that, when executed, cause a system to:
 receive a request from a client device for a just-in-time (JIT) account with a set of elevated access permissions to access a server device in a set of server devices wherein the set of server devices is segmented into a plurality of breach boundaries and each breach boundary of the plurality of breach boundaries is associated with a single security group configured to grant access to a set of server devices in each breach boundary, the client device having an associated client account;

authorize the request for the JIT account based at least partially on password information associated with the client account;

create the JIT account to enable access the server device by identifying a security group configured to grant access to breach boundary comprising the server device and associating the JIT account with the security group to enable the JIT account access to the server device in the breach boundary; and provide account information associated with the JIT account to the client device.

12. The computer-readable storage hardware of claim 11, wherein the instructions to authorize the request to elevate permission that, when executed, further cause the system to:

determine a scope and a role associated with the request;

determine a scope and a role associated with the client account based on client account information; and authorize the request based on the scope and the role of the client account.

13. The computer-readable storage hardware of claim 12, wherein the instructions to provision the JIT account that, when executed further, cause the system to:

determine existence of the JIT account having the set of elevated access permissions;

retrieve the JIT account from a JIT accounts datastore, when the JIT account already exists in the JIT accounts datastore; and enable the JIT account for access to the server device.

14. The computer-readable storage hardware of claim 13, wherein the password information comprises a random password generated by an authentication token management application and the random password comprises at least two different character classes.

15. The computer-readable storage hardware of claim 11, comprising instructions that, when executed, cause the system to:

determine lifetime associated with the JIT account; and disable the JIT account, when the lifetime associated with the JIT account indicates that the JIT account has expired.

16. The computer-readable storage hardware of claim 11, comprising instructions that, when executed, cause the system to:

remove the JIT account, when the JIT account is disabled and has not been accessed for a defined period of time by the client.

* * * * *